United States Patent [19]

Reik

[11] Patent Number: 4,538,716
[45] Date of Patent: * Sep. 3, 1985

[54] MULTIPLE-DISC FRICTION CLUTCH AND DIAPHRAGM SPRING THEREFOR

[75] Inventor: Wolfgang Reik, Bühl, Fed. Rep. of Germany

[73] Assignee: Luk Lamellen und Kupplungsbau GmbH, Bühl, Fed. Rep. of Germany

[*] Notice: The portion of the term of this patent subsequent to Jan. 29, 2002 has been disclaimed.

[21] Appl. No.: 410,845

[22] Filed: Aug. 23, 1982

[30] Foreign Application Priority Data

Feb. 10, 1982 [DE] Fed. Rep. of Germany ....... 3204614

[51] Int. Cl.³ .............................. F16F 1/32; F16F 1/34; F16D 21/06; F16D 13/44
[52] U.S. Cl. ............................... 192/70.29; 192/48.8; 192/70.3; 192/89 B; 267/161
[58] Field of Search ............... 192/89 B, 70.27, 70.3, 192/70.29, 48.7, 48.8, 70.21; 267/161, 162, 163, 181

[56] References Cited

U.S. PATENT DOCUMENTS

| | | | |
|---|---|---|---|
| 2,117,482 | 5/1938 | Klix | 192/70.27 X |
| 2,630,897 | 3/1953 | Porter | 267/161 X R |
| 2,706,491 | 4/1955 | Kohler | 267/161 X |
| 3,206,220 | 9/1965 | Ferrtuti | 267/161 X |
| 4,126,216 | 11/1978 | Babcock et al. | 192/89 B |
| 4,241,819 | 12/1980 | Babcock et al. | 192/89 B X |
| 4,429,776 | 2/1984 | Maucher et al. | 192/99 A |

FOREIGN PATENT DOCUMENTS

| | | | |
|---|---|---|---|
| 0173597 | 6/1952 | Austria | 192/70.27 |
| 1212363 | 3/1966 | Fed. Rep. of Germany | 192/89 B |
| 2146587 | 3/1972 | Fed. Rep. of Germany | |
| 2147035 | 8/1976 | Fed. Rep. of Germany | |
| 3013298 | 4/1980 | Fed. Rep. of Germany | |
| 7515455 | 12/1976 | France | 192/89 B |
| 0619700 | 4/1961 | Italy | 267/161 |
| 1066876 | 5/1967 | United Kingdom | 192/89 B |
| 1435908 | 5/1976 | United Kingdom | 192/89 B |
| 0469016 | 7/1975 | U.S.S.R. | 267/162 |
| 0708085 | 1/1980 | U.S.S.R. | 192/89 B |

*Primary Examiner*—Rodney H. Bonck
*Assistant Examiner*—David D. House
*Attorney, Agent, or Firm*—Peter K. Kontler

[57] ABSTRACT

A multiple-disc friction clutch wherein two axially movable pressure plates are disposed between two clutch plates and flank a diaphragm spring whose circumferentially complete outer marginal portion engages one of the pressure plates and which has a second portion located radially inwardly of the marginal portion and engaging the other pressure plate. The second portion of the diaphragm spring has a circumferentially complete tension spring which stores energy in addition to that stored in the outer marginal portion. The tension spring is located radially inwardly of the regions where the second portion engages the other pressure plate.

24 Claims, 6 Drawing Figures

MULTIPLE-DISC FRICTION CLUTCH AND DIAPHRAGM SPRING THEREFOR

CROSS-REFERENCE TO RELATED CASES

The diaphragm springs which are used in the friction clutch of the present invention are disclosed in the commonly owned copending application Ser. No. 398,717 filed by me on July 15, 1982 for "Friction clutch", in the commonly owned copending application Ser. No. 396,805 filed by me on July 9, 1982 for "Diaphragm spring for use in friction clutches and the like", and in the commonly owned copending application Ser. No. 398,637 filed by me on July 15, 1982 for "Friction clutch and diaphragm spring therefor". The last mentioned copending application further shows a clutch of the type covered by the claims of the present application.

BACKGROUND OF THE INVENTION

The present invention relates to friction clutches in general, especially to multiple-disc or multiple-plate friction clutches, and more particularly to improvements in friction clutches of the type wherein a diaphragm spring (also called cup spring or belleville washer) is disposed between two axially movable pressure plates so that a first portion thereof engages one of the pressure plates and a second portion thereof (which is located radially inwardly of the first portion) engages the other pressure plate in order to urge the two pressure plates against discrete clutch discs or clutch plates.

Friction clutches of the above outlined character are disclosed, for example, in commonly owned German Offenlegungsschrift No. 2,146,587, in commonly owned U.S. patent application Ser. No. 232,246, filed Feb. 6, 1981 by Paul Maucher, now U.S. Pat. No. 4,429,716, for "Double Friction Clutch", and in German Offenlegungsschrift No. 2,147,035. Such clutches are often used in special types of conveyances, for example, in tractors, implement carriers, building machinery and others. Depending on the intended use and/or design of a multiple-plate friction clutch, the various clutch units (each having a clutch plate and a pressure plate) can be actuated (i.e., engaged and/or disengaged) simultaneously, independently of one another or in a given sequence. Each disengagement involves axial movement of the respective pressure plate away from the associated clutch plate. In double-plate friction clutches wherein one of the pressure plates is moved axially after the other pressure plate, the actuating means normally comprises three levers. On the other hand, a double-plate friction clutch wherein each of the pressure plates can be moved independently of the other pressure plate normally comprises two sets of levers and each such set normally comprises three discrete levers.

The diaphragm spring of a multiple-plate friction clutch constitutes a component part whose design must be selected with utmost care because the spring must stand very pronounced stresses. The diaphragm spring should be capable of transmitting pronounced forces (such forces are applied to the pressure plates to urge the latter against the respective clutch plates which, in turn, bear against torque-transmitting devices in the form of rotary housings, flywheels or the like), and the diaphragm spring should also have a long useful life in spite of frequent and pronounced dynamic stressing. An additional problem which must be solved is that, under certain circumstances, each of the two pressure plates which flank the diaphragm spring must be disengaged from the respective clutch plate at the same time so that the diaphragm spring of such multiple-plate friction clutch must undergo very pronounced deformation which is approximately twice that of a diaphragm spring in a simple friction clutch with one pressure plate.

Commonly owned German Offenlegungsschrift No. 3,013,298 discloses a multiple-plate friction clutch with several clutch units wherein a single diaphragm spring is common to the two units, i.e., a single diaphragm spring can displace two axially movable pressure plates. The diaphragm spring comprises a circumferentially complete outer marginal portion and radially inwardly extending prongs alternating with elongated open slots. The prongs act not unlike levers which displace the actual diaphragm spring, namely, the aforementioned outer marginal portion, in response to the application of a pressure or pull upon their inner end portions or tips. The prongs ensure uniform stressing of the outer marginal portion when the latter is tilted to change the extent of its conicity.

OBJECTS AND SUMMARY OF THE INVENTION

An object of the invention is to provide a friction clutch, especially a multiple-plate friction clutch, wherein the force which the diaphragm spring applies to the pressure plate or plates can be increased well beyond those forces which can be applied in heretofore known friction clutches having the same dimensions.

Another object of the invention is to provide a friction clutch wherein the diaphragm spring can transmit substantial moments without necessitating pronounced changes in the overall design of the friction clutch, i.e., without departing from the optimum relationship and dimensioning of various component parts of the clutch.

A further object of the invention is to provide a friction clutch wherein the diaphragm spring can transmit pronounced forces without necessitating any increase in its diameter and/or thickness.

An additional object of the invention is to provide a friction clutch, particularly a multiple-plate friction clutch, wherein a single diaphragm spring can store as much as or more energy than two discrete diaphragm springs of the type used in heretofore known friction clutches.

Still another object ot the invention is to provide a novel and improved double- or twin-plate friction clutch. Another object of the invention is to provide a novel and improved method of assembling a friction clutch of the above outlined character.

A further object of the invention is to provide a friction clutch wherein the outer marginal portion of the diaphragm spring is subjected to less pronounced stresses than in heretofore known friction clutches.

Another object of the invention is to provide a friction clutch wherein the tensioning of the outer marginal portion of the diaphragm spring can be reduced without reducing the maximum force which such diaphragm spring can transmit to one or more pressure plates and without necessitating any overdimensioning of the diaphragm spring.

Still another object of the invention is to provide a friction clutch, especially a multiple-plate friction clutch, whose useful life (including the useful life of its diaphragm spring) is much longer than that of heretofore known friction clutches.

A further object of the invention is to enhance the reliability and to reduce the maintenance cost of friction clutches, especially multiple-plate friction clutches, of the above outlined character.

The invention is embodied in a friction clutch, especially in a multiple disc (e.g., twin-disc) friction clutch, which comprises a pair of axially movable pressure plates, a pair of clutch plates which flank the pressure plates and are provided with customary friction coatings, and a diaphragm spring which is disposed between the two pressure plates and includes a circumferentially complete outer marginal portion which engages one of the pressure plates and a second portion disposed radially inwardly of the marginal portion and engaging the other pressure plate so that the pressure plates are biased axially against the respective clutch plates in engaged condition of the clutch. In accordance with a feature of the invention, the second portion of the diaphragm spring includes a part which is disposed inwardly of the region of engagement with the other pressure plate and comprises a plurality of interconnected sections which together constitute at least one circumferentially complete tension spring.

The second portion of the diaphragm spring defines a substantially centrally located opening and includes an annulus of prongs having radially innermost portions or tips which surround the opening. The second portion of the spring has preferably radially outwardly extending open slots which alternate with the prongs, and closed slots having enlarged outer portions disposed inwardly of the marginal portion and outwardly of the open slots, as considered in the radial direction of the spring. The closed slots further have inner portions which extend toward but short of the opening (i.e., the tips of the prongs extend radially inwardly beyond the neighboring closed slots) and overlap the neighboring open slots. The inner portions of the closed slots preferably extend substantially radially of the diaphragm spring, and each inner portion extends into one of the prongs. Each pair of neighboring open slots can flank at least one closed slot, and more particularly the inner portion of at least one closed slot.

The second portion of the spring includes an annulus of webs or ribs which alternate with the enlarged outer portions of the closed slots and engage the other pressure plate.

The inner portions of the closed slots can constitute relatively narrow slits, and the outer portions of the closed slots can constitute or resemble circular, elliptical, polygonal or otherwise configurated holes. The open slots of the diaphragm spring form a first annulus, and the outer portions of the closed slots form a second annulus whose outer diameter exceeds, preferably by at least 15 percent, the outer diameter of the first annulus. The width of the outer portion of each closed slot (as considered in the circumferential direction of the diaphragm spring) can considerably exceed the width of the respective inner portion, and the width of the open slots can be a small fraction of the width of outer portions of the closed slots. Each open slot and the inner portion of each closed slot can constitute a relatively narrow slit of substantially constant width.

The arrangement may be such that the edge faces which form part of the second portion and flank the open slots can be at least substantially parallel with the inner portions of the neighboring closed slots, at least in the regions of overlap between the open and closed slots. To this end, the width of the open slots can increase radially outwardly and/or the width of the inner portions of closed slots can decrease radially outwardly and/or the width of the prongs can increase radially outwardly.

The aforementioned sections of the inner portion of the diaphragm spring can be said to constitute bridges or lands each of which is flanked by one of the open slots and one of the closed slots, and the width of such lands, as considered in the circumferential direction of the diaphragm spring, can be at least substantially constant, at least in the regions of overlap between the open and closed slots.

The number of closed slots can exceed the number of open slots; in such a diaphragm spring, each pair of neighboring open slots can flank a plurality of closed slots, as considered in the circumferential direction of the spring.

The second portion of the diaphragm spring can further have at least one preferably elongated and preferably radially extending cutout provided in each prong so that it overlaps portions of the neighboring open and closed slots, as considered in the radial direction of the diaphragm spring. The inner portion of each closed slot is then preferably aligned with one of the open slots, as considered in the radial direction of the diaphragm spring, and the inner portions of the closed slots preferably terminate at a substantial distance radially outwardly of the aligned open slots. Each cutout can be disposed substantially midway between two neighboring open slots and two neighboring closed slots, as considered in the circumferential direction of the diaphragm spring. If the second portion of the diaphragm spring is formed with the aforementioned cutouts, it can define a plurality of circumferentially complete energy-storing tension springs located radially inwardly of the outer marginal portion. One of such tension springs is then adjacent to and merges into the tips of the prongs, and another tension spring is adjacent to and merges into the webs between the outer portions of the closed slots. The open slots and the inner portions of the closed slots preferably extend radially of the diaphragm spring which has several tension springs.

The novel features which are considered as characteristic of the invention are set forth in particular in the appended claims. The improved friction clutch itself, however, both as to its construction and the mode of assembling and operating the same, together with additional features and advantages thereof, will be best understood upon perusal of the following detailed description of certain specific embodiments with reference to the accompanying drawings.

DESCRIPTION OF THE PREFERRED EMBODIMENTS

Figure 1:
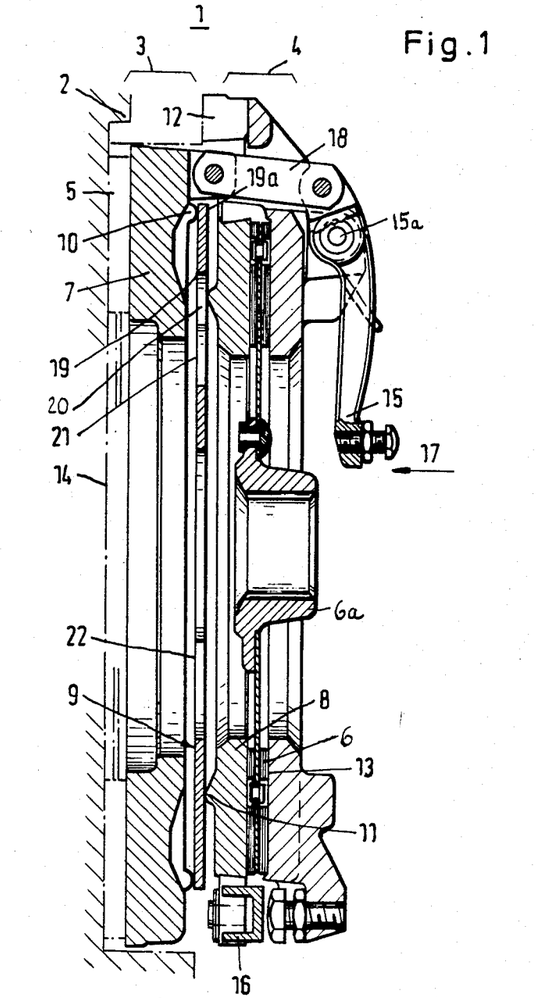
FIG. 1 is an axial sectional view of a multiple-disc friction clutch which embodies one form of the invention.

Referring first to FIG. 1, there is shown a multiple-disc or multiple-plate friction clutch 1 which is secured to and receives torque from a flywheel 2. The latter is driven by a prime mover, e.g., by the crankshaft of an internal combustion engine in an automotive vehicle. The clutch 1 comprises a first clutch unit 3 which serves to establish or terminate a torque transmitting connection between the flywheel 2 and a first torque-receiving device, such as the input shaft of a change-speed transmission, and a second clutch unit 4 which can transmit torque from the flywheel 2 to a second torque-receiving device, e.g., a power take-off.

The clutch unit 3 comprises a first clutch plate or clutch disc 5 having two friction coatings one of which is adjacent to the right-hand side or surface 14 of the flywheel 2 and the other of which is adjacent to a first axially movable pressure plate 7. The clutch plate 5 further comprises a hub (not shown) which transmits torque to the aforementioned first torque-receiving device (e.g., the input shaft of the change-speed transmission). The clutch unit 4 comprises a second clutch plate or clutch disc 6 installed between a second pressure plate 8 and a cover 12 which is bolted or otherwise connected to and rotates with the flywheel 2. The second clutch plate 6 comprises a first friction coating which is adjacent to the pressure plate 8, a second friction coating which is adjacent to the cover 12, and a hub 6a which drives the aforementioned second torque-receiving device.

The clutch 1 further comprises a diaphragm spring 9 which is common to the units 3, 4 and is disposed between the pressure plates 7 and 8 which, in turn, are flanked by the clutch plates 5 and 6. When the clutch units 3 and 4 are engaged, the radially outermost part 19a of the circumferentially complete outer marginal portion 19 of the diaphragm spring 9 bears against a set of projections 10 on the pressure plate 7 to urge the pressure plate against the clutch plate 5 which, in turn, is biased against the flywheel 2 so that the latter can transmit torque to the first torque-receiving device. At the same time, a second portion 20 of the diaphragm spring 9, namely, a portion which is disposed radially inwardly of the marginal portion 19, bears upon the projections 11 of the pressure plate 8 to urge the latter against the clutch plate 6 which, in turn, bears against the cover 12 (the latter rotates with the flywheel 2) so that the hub 6a of the clutch plate 6 can drive the second torque-receiving device. The cover 12 can be said to constitute a common housing for the clutch units 3 and 4 and has a surface 13 which transmits torque to the right-hand friction coating of the clutch plate 6 when the clutch unit 4 is engaged.

The clutch actuating means comprises a first set of three equidistant levers 15 which are articulately connected with the cover 12 by pins 15a extending substantially tangentially of the diaphragm spring 9. The longer arms of the levers 15 extend radially inwardly and can be moved in the direction of arrow 17 in order to disengage the clutch unit 3. To this end, the radially outwardly extending shorter arms of the levers 15 act upon the pressure plate 7 through the medium of links 18 so that they can pull the pressure plate 7 away from the clutch plate 5 and the latter then ceases to receive torque from the flywheel 2. The clutch actuating means comprises three additional equidistant levers 16 which serve to move the pressure plate 8 away from the clutch plate 6 in response to pivoting of the levers 15 in the direction of arrow 17 whereby the pressure plate 8 enables the clutch plate 6 to move away from and to cease to be rotated by the cover 12. The manner in which the levers 16 cooperate with the levers 15 to disengage the clutch unit 4 in response to disengagement of the clutch unit 3 will be readily understood by referring, for example, to commonly owned copending patent application Ser. No. 232,246 filed Feb. 6, 1981, now U.S. Pat. No. 4,429,776, for "Double Friction Clutch". For the sake of convenience, the disclosure of the application Ser. No. 232,246 now U.S. Pat. No. 4,429,776 is incorporated herein by reference.

The second portion 20 of the diaphragm spring 9 has a part which extends radially inwardly beyond the regions of contact with the projections 11 of the pressure plate 8, and such part includes a plurality of sections (two shown at 21 and 22) which are connected to each other in a manner and for the purposes as will be described hereinafter with reference to FIGS. 2, 3a, 3b, 4 or 5.

Figure 2:
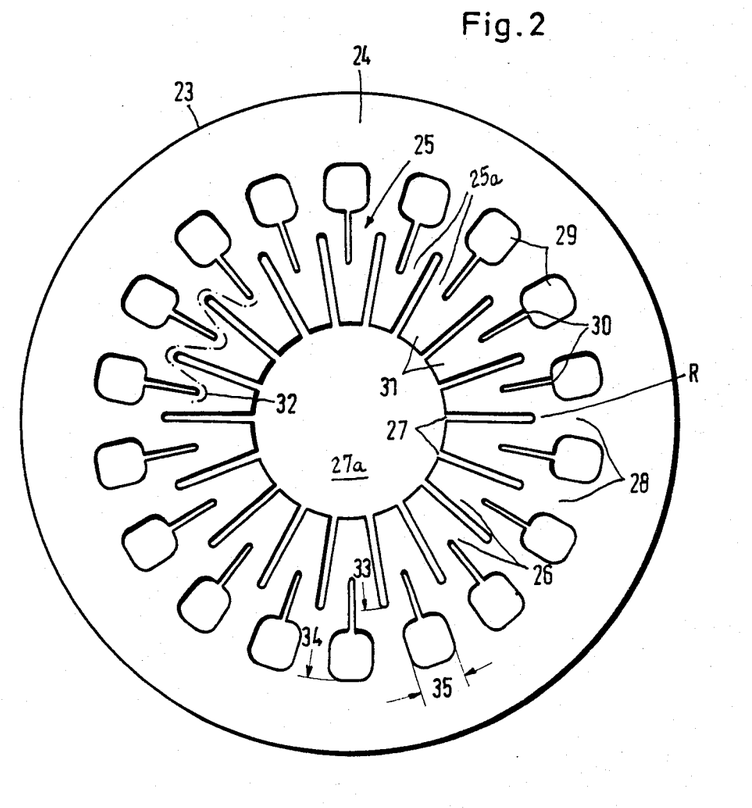
FIG. 2 is an elevational view of the diaphragm spring which is used in the friction clutch of FIG. 1.

Referring now to FIG. 2, there is shown a diaphragm spring 23 which comprises a circumferentially complete outer marginal portion 24 corresponding to the portion 19 of the spring 9 shown in FIG. 1, and a second portion 25 located radially inwardly of the marginal portion 24 and corresponding to the second portion 20 of the diaphragm spring 9. The second portion 25 is formed with an annulus of equidistant substantially radially extending narrow slit-shaped open slots 27 communicating with a centrally located opening 27a, and with an annulus of equidistant substantially radially extending closed slots having enlarged outer portions 29 inwardly adjacent to the marginal portion 24 and radially inwardly extending narrow slit-shaped inner portions 30 which alternate with and partially overlap the neighboring open slots 27, as considered in the radial direction of the spring 23. The second portion 25 includes an annulus of ribs or webs 28 which alternate with the outer portions 29 of the closed slots and engage with the projections 11 of the pressure plate 8 if the diaphragm spring 23 is installed in the friction clutch 1 of FIG. 1 in lieu of the diaphragm spring 9. Still further, the second portion 25 of the diaphragm spring 23 comprises an annulus of fingers or prongs 26 into which the inner portions 30 of the closed slots extend and which include inner end portions or tips 31 directly surrounding the opening 27a. It will be noted that the inner portions 30 of the closed slots terminate short of the tips 31 of the respective prongs 26. The outer portions 29 of the closed slots constitute or resemble holes having a circular, oval, polygonal or other outline and a width 35 (as considered in the circumferential direction of the spring 23) which is a multiple of the width of the inner portions 30 of the respective closed slots and of the width of the open slots 27. The width of the inner portions 30 and of the open slots 27 is preferably constant all the way from the inner to the outer ends thereof. It will be noted that each inner portion 30 is flanked by and is disposed at least substantially midway between two neighboring open slots 27. The extent of overlap between the inner portions 30 of the closed slots and the neighboring open slots 27 can change; in the diaphragm spring 23, the extent of overlap approximates half the length of an inner portion 30 and approximately one-third of the length of an open slot 27.

The second portion 25 of the diaphragm spring 23 includes an annulus of interconnected sections in the form of bridges or lands 25a each of which is flanked by the inner portion 30 of a closed slot and by the outer portion of an open slot 27. The width of the bridges 25a is at least substantially constant, and such bridges together constitute a meandering or undulate annulus 32 (indicated by a phantom line) which acts not unlike a circumferentially complete tension spring R. The tension spring R is integral with the webs 28 and also with the tips 31 of the prongs 26. The bridges 25a can be said to constitute means for integrally connecting the webs 28 with the tips 31 of the prongs 26, and the tension spring R serves to store energy in addition to that energy which is stored in the circumferentially complete outer marginal portion 24 of the diaphragm spring 23.

The outer diameter 34 of the annulus which is formed by the enlarged hole-like outer portions 29 of the closed slots preferably exceeds the outer diameter 33 of the annulus of open slots 27 by at least 15 percent.

It will be noted that the tension spring R is formed by those sections (25a) of the second portion 25 of the diaphragm spring 23 which are disposed in the regions of overlap between the open slots 27 and the inner portions 30 of the closed slots. All this is accomplished by the simple expedient that the open slots 27 do not extend all the way to the enlarged outer portions 29 of the closed slots, i.e., that the inner portions 30 of the closed slots do not extend all the way to the opening 27a. The tension spring R stores energy when the conicity of the diaphragm spring 23 changes, i.e., when the clutch unit 3 and/or 4 is engaged or disengaged. Such change of conicity is caused by or entails changes in the mutual spacing of the tips 31 of the prongs 26. Any such changes in mutual spacing of the tips 31 entail the development of stresses in the bridges 25a which together form the tension spring R, and the stresses enable the spring R to store energy in addition to that which is stored by the outer marginal portion 24.

It is desirable to select the configuration and dimensions of the open slots 27 and of the closed slots including the portions 29 and 30 in such a way that the sections (25a) of the tension spring R can flex or bend relative to one another, as considered in the circumferential direction of the diaphragm spring 23. This ensures that, when the conicity of the diaphragm spring 23 is changed as a result of actuation of the clutch 1, the second portion 25 of the diaphragm spring does not transmit any appreciable stresses to the outer marginal portion 24. In other words, the neighboring sections (25a) of the tension spring R should be capable of performing at least some movements with reference to each other; this prevents the transmission of pronounced stresses to the outer marginal portion 24 even though the latter is integrally connected with the tension spring R by the annulus of webs or ribs 28 which alternate with the enlarged portions 29 of the closed slots. It has been found that the just discussed design of the tension spring R limits the magnitude of stresses to which the outer marginal portion 24 is subjected and allows for so-called "breathing" of the second portion 25 of the diaphragm spring 23. Such "breathing" is especially satisfactory if the aforediscussed diameter 34 exceeds the diameter 33 by at least 15 percent.

The feature that the width 35 of the enlarged hole-like outer portions 29 of the closed slots greatly exceeds the width of the inner portions 30 is of advantage in diaphragm springs which are used in many types of friction clutches. The same applies for the feature that the width 35 of an outer portion 29 is several times the width of an open slot 27.

The outer parts of the open slots 27 and the inner parts of the inner portions 30 can be said to be at least substantially parallel to each other, especially if the second portion 25 is formed with a relatively large number of rather closely adjacent open and closed slots. This is desirable and advantageous in diaphragm springs for many types of friction clutches, e.g., in friction clutches whose work capacity should be high or very high.

Figures 3A, 3B:
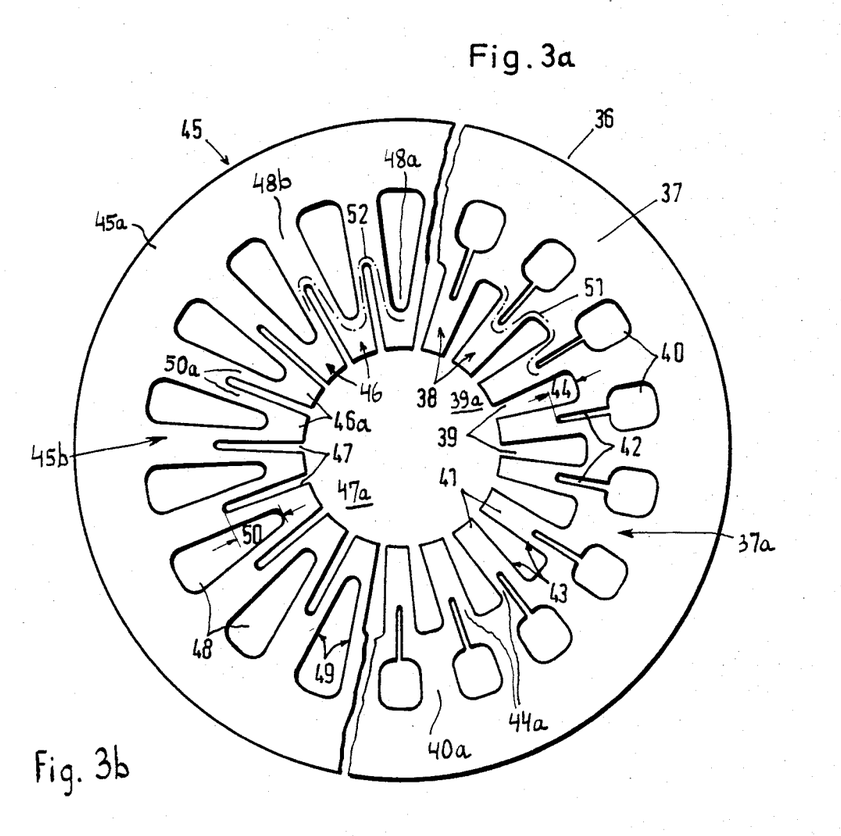
FIG. 3a is a fragmentary elevational view of a second diaphragm spring which can be used in the friction clutch of FIG. 1 in lieu of the diaphragm spring shown in FIG. 2.
FIG. 3b is a similar fragmentary elevational view of a third diaphragm spring.

The diaphragm spring 36 of FIG. 3a comprises a circumferentially complete outer marginal portion 37 and a second portion 37a which is located radially inwardly of the portion 37 and is formed with an annulus of equidistant closed slots including enlarged hole-like outer portions 40 and radially inwardly extending slit-shaped inner portions 42 alternating with and partly overlapping open slots 39 which alternate with radially inwardly extending prongs 38 having inner end portions or tips 41 which surround a centrally located opening 39a. The width of open slots 39 increases radially outwardly and the outermost parts of such open slots terminate radially inwardly of the enlarged outer portions 40 of the neighboring closed slots. The extent of overlap between the inner portions 42 of the closed slots and the open slots 39 is shown at 44. The regions of overlap again contain a number of interconnected sections in the form of bridges or lands 44a which constitute a meandering or undulate circumferentially complete tension spring 51. The width of the prongs 38 is at least substantially constant and the pairs of edge faces 43 flanking the radially outwardly diverging open slots 37 in the second portion 37a of the diaphragm spring 36 are at least substantially parallel to the neighboring inner portions 42. In other words, the width of the bridges 44a, which together constitute the tension spring 51, is constant or nearly constant.

The tension spring 51 is integral with the ribs or webs 40a, which alternate with the enlarged outer portions 40 of the closed slots, as well as with the tips 41 of the prongs 38.

The feature that the bridges 44a have an at least substantially constant width, at least in the regions of overlap between the open slots 39 and the inner portions 42 of the closed slots, has been found to be desirable and advantageous in many types of friction clutches, especially if it is desired to impart to the prongs 38 an accurately determined flexibility or rigidity. The cross-section of each bridge 44a is constant, at least in the region between the radially outermost part of the neighboring open slot 39 and the radially innermost part of the neighboring inner portion 42.

FIG. 3b shows a further diaphragm spring 45 having a circumferentially complete outer marginal portion 45a and a second portion 45b which is disposed radially inwardly of the outer marginal portion 45a and is formed with an annulus of equidistant closed slots having enlarged outer portions 48 and inwardly tapering inner portions 48a which terminate short of the inner end portions or tips 46a of the respective fingers or prongs 46. The tips 46a surround a centrally located opening 47a which communicates with radially outwardly extending narrow slit-shaped open slots 47 alternating with the prongs 46 and extending outwardly toward but short of the enlarged outer portions 48 of the closed slots. The edge faces 49 bounding the inner portions 48a of the closed slots are at least substantially parallel with the neighboring open slots 47, i.e., the width of interconnected sections in the form of bridges or lands 50a in the regions 50 of overlap between the open slots 47 and the inner portions 48a of the closed slots is at least substantially constant, at least in the regions 50 of overlap. The width of the prongs 46 increases in a direction from the opening 47a toward the outer marginal portion 45a. The bridges 50a together constitute a circumferentially complete annular tension spring 52 which stores energy in addition to that which is stored in the outer marginal portion 45a. The bridges 50a are integral with the webs 48b between the outer portions 48 of the closed slots, as well as with the tips 46a of the prongs 46.

Figure 4:
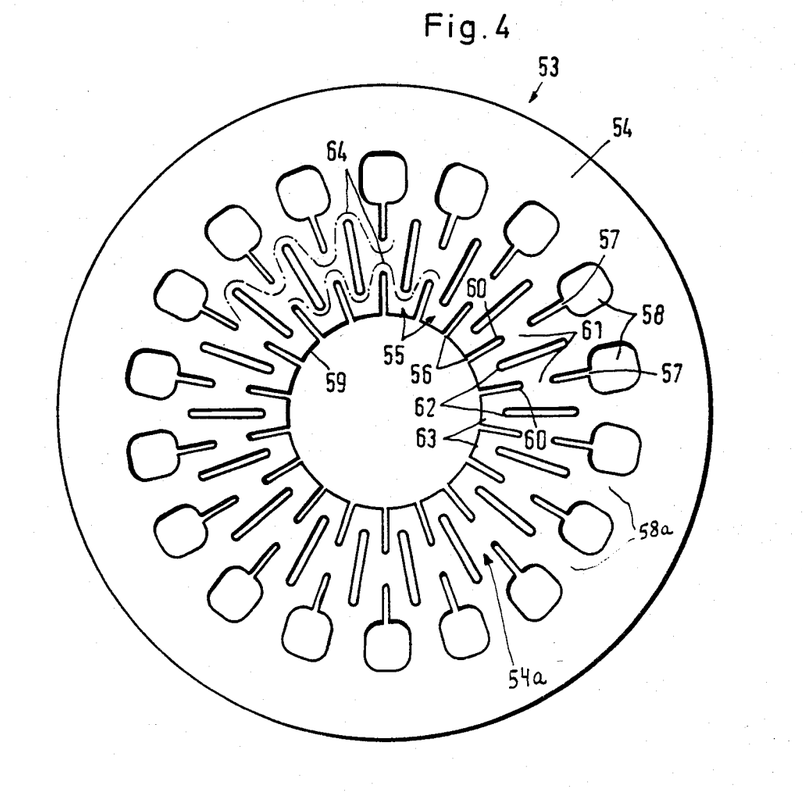
FIG. 4 is an elevational view of a fourth diaphragm spring wherein the prongs of the inner portion are formed with radially extending elongated cutouts overlapping the neighboring open and closed slots.

The diaphragm spring 53 of FIG. 4 comprises a circumferentially complete outer marginal portion 54 and a second portion 54a which is located radially inwardly of the marginal portion 54 and comprises an annulus of radially extending fingers or prongs 55 surrounding a centrally located opening 59 and alternating with radially extending narrow slit-shaped open slots 56. The second portion 54a of the diaphragm spring 53 is further formed with an annulus of equidistant closed slots having hole-like enlarged outer portions 58 forming an annulus immediately inwardly of the marginal portion 54 and radially inwardly extending slit-shaped narrow inner portions 57 each of which registers with one of the open slots 56. It will be noted that the radially outermost parts 60 of the open slots 56 are disposed at a substantial distance (as considered radially of the diaphragm spring 53) from the innermost parts of inner portions 57 of the closed slots. This causes the formation of relatively wide (as considered in the radial direction of the diaphragm spring) sections in the form of bridges or lands 61.

The second portion 54a of the diaphragm spring 53 is further formed with an annulus of elongated slit-shaped cutouts 62 which alternate with the open slots 56 and with the inner portions 57 of the closed slots and each of which partially overlaps the neighboring open slots 56 as well as the neighboring inner portions 57 (as considered in the radial direction of the diaphragm spring 53). The innermost parts of the cutouts 62 terminate short of the opening 59, i.e., radially outwardly of the inner end portions or tips 63 of the prongs 55 whose width increases in a direction toward the outer marginal portion 54.

As indicated by the phantom lines 64, the second portion 54a of the diaphragm spring 53 forms two circumferentially complete undulate or meandering tension springs including (a) an outer tension spring which is integral with the webs or ribs 58a between the outer portions 58 of the closed slots and (b) an inner tension spring which is integral with the tips 63 of the prongs 55. These tension springs store energy in addition to that which is stored in the outer marginal portion 54 of the diaphragm spring 53. The individual bridges or lands of the two tension springs are free to flex relative to each other, as considered in the circumferential direction of the tension springs.

Figure 5:
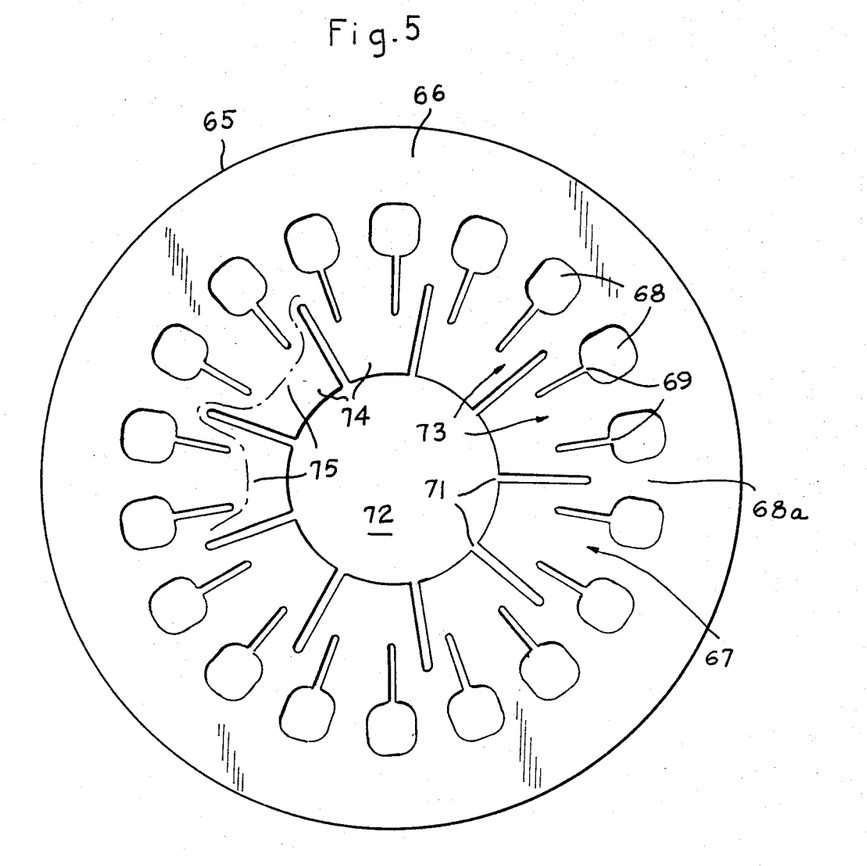
FIG. 5 is an elevational view of a fifth diaphragm spring wherein the number of closed slots exceeds the number of open slots.

FIG. 5 illustrates a diaphragm spring 65 having a circumferentially complete outer marginal portion 66 and a second portion 67 which is located radially inwardly of the marginal portion 66 and has an annulus of equidistant closed slots including enlarged outer portions 68 and narrow slit-shaped radially inwardly extending inner portions 69. The second portion 67 is further formed with a centrally located opening 72 communicating with radially outwardly extending open slots 71 alternating with fingers or prongs 73 whose inner end portions or tips 74 are immediately adjacent the opening 72. The webs or ribs which alternate with the outer portions 68 of the closed slots are shown at 68a; such webs are integral with the sections of a circumferentially complete tension spring 75 serving to store energy in addition to that which is stored in the marginal portion 66. The number of closed slots is twice the number of open slots 71; therefore, each pair of neighboring open slots 71 flanks the inner portions 69 of two closed slots. The inner portions 69 partially overlap the neighboring open slots 71, as considered in the radial direction of the diaphragm spring 65.

The present invention is based, at least in part, on the discovery that the utilization of material in a diaphragm spring of conventional design is unsatisfactory in spite of the fact that even such conventional diaphragm springs constitute that type of springs which can store (statically as well as dynamically) the maximum amounts of elastic energy per unit of volume. The unsatisfactory ratio of volume to the ability of a conventional diaphragm spring to store energy is attributable to the fact that, for all practical purposes, only the circumferentially complete outer marginal portion of a conventional diaphragm spring is available for the storage of elastic energy. In other words, energy is stored only in a relatively small fraction of the material which is used up for the making of a conventional diaphragm spring.

The simplest mode of increasing the energy-storing capacity of a diaphragm spring would be to increase the outer diameter (i.e., the width of the outer marginal portion) and/or to increase the thickness of the material of the diaphragm spring. Neither of these solutions is practical in many instances, particularly because this would necessitate changes in the dimensions of other parts of the friction clutch, i.e., this would necessitate a departure from optimal dimensioning of the clutch. Moreover, undue increases of the outer diameter and/or of the thickness of a diaphragm spring would adversely influence the so-called $h_o/s$ ratio wherein s is the thickness of the diaphragm spring and $h_o$ is the distance which the diaphragm spring must cover in order to be converted from a hollow conical body into a substantially flat washer. Unsatisfactory $h_o/s$ ratio reduces the useful life of the diaphragm spring.

If the diaphragm spring (9, 23, 36, 45, 53 or 65) which is used in the friction clutch of the present invention employs the same quantity of material as a conventional diaphragm spring, it can store a much larger quantity of energy since such energy is stored not only in the outer marginal portion but also in the tension spring or springs of the second portion. Alternatively, the quantity of material in the diaphragm spring of the improved friction clutch can be reduced to a fraction of the material in a conventional diaphragm spring without reducing the energy-storing ability of the improved spring and by simultaneously prolonging the useful life of the improved spring and of the novel friction clutch in which the improved diaphragm spring is installed. Still further, the diaphragm spring of the improved friction clutch renders it possible to achieve variations or progresses of disengaging forces which cannot be achieved in heretofore known friction clutches employing conventional diaphragm springs.

All or nearly all of the above outlined advantages of the improved friction clutch can be achieved by the simple expedient of imparting to the second portion of the diaphragm spring a novel configuration, i.e., of providing the second portion with sections which are connected to each other to form at least one circumferentially complete tension spring. This entails savings in material because some of the material which is removed from a blank in order to form a conventional diaphragm spring is not removed so that it can constitute the interconnected sections in the form of bridges or lands together forming one or more tension springs which are capable of storing energy in addition to that stored in the outer marginal portion. Thus, whereas the second portion of a conventional diaphragm spring (namely, the portion which is located within the confines of the circumferentially complete outer marginal portion) merely serves as a lever assembly to change the shape of the outer marginal portion during engagement or disengagement of the clutch, the second portion of the diaphragm spring which is used in the friction clutch of the present invention can perform the functions of prongs in a conventional diaphragm spring plus a highly desirable energy storing function.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, especially a multiple-disc clutch, comprising a pair of axially movable pressure plates; a pair of clutch plates flanking said pressure plates; and a diaphragm spring disposed between said pressure plates and including a circumferentially extending marginal portion engaging one of said pressure plates and a second portion disposed radially inwardly of said marginal portion, one of said portions engaging the other of said pressure plates radially inwardly of the locus of engagement between said marginal portion and said one pressure plate so that said pressure plates are biased against the respective clutch plates in the engaged condition of the clutch, said second portion including a part disposed radially inwardly of the region of engagement of said one portion with said other pressure plate and comprising a plurality of sections which are connected to each other at locations disposed radially inwardly of said region of engagement, said second portion defining a substantially centrally located opening and further including an annulus of prongs surrounding said opening, said second portion further having open slots alternating with said prongs and closed slots including enlarged outer portions inwardly adjacent to said marginal portion and inner portions extending toward but short of said opening and overlapping the neighboring open slots, as considered in the radial direction of said diaphragm spring, said open slots being located radially inwardly of said enlarged outer portions.

2. The friction clutch of claim 1, wherein the width of said outer portions, as considered in the circumferential direction of the diaphragm spring, substantially exceeds the width of the respective inner portions.

3. The friction clutch of claim 2, wherein the width of said open slots is a fraction of the width of said outer portions.

4. The friction clutch of claim 3, wherein the outer portions of said closed slots constitute holes.

5. The friction clutch of claim 4, wherein the inner portions of said closed slots and said open slots constitute slits of at least substantially constant width.

6. The friction clutch of claim 1, wherein the number of said closed slots exceeds the number of said open slots.

7. The friction clutch of claim 6, wherein each pair of neighboring open slots flanks a plurality of closed slots.

8. The friction clutch of claim 7, wherein the inner portions of said closed slots are elongated slits and said prongs have tips which are disposed radially inwardly of said slits.

9. The friction clutch of claim 1, wherein said second portion has pairs of edge faces flanking said open slots and the inner portions of said closed slots are at least substantially parallel to the neighboring edge faces, at least in the regions of overlap between said open slots and the neighboring closed slots.

10. The friction clutch of claim 9, wherein the width of said open slots increases radially outwardly.

11. The friction clutch of claim 9, wherein the width of the inner portions of said closed slots decreases radially inwardly.

12. The friction clutch of claim 1, wherein said second portion includes an annulus of webs alternating with the outer portions of said closed slots and engaging said other pressure plate, said sections of said second portion constituting at least one circumferentially complete tension spring which is integral with said webs.

13. The friction clutch of claim 12, wherein said inner portions are relatively narrow slits and said outer portions of said closed slots constitute holes.

14. The friction clutch of claim 1, wherein said inner portions extend substantially radially of the diaphragm spring and each thereof extends into one of said prongs, each pair of neighboring open slots flanking at least one closed slot.

15. The friction clutch of claim 1, wherein said open slots form a first annulus having a first outer diameter and said closed slots form a second annulus having a second outer diameter exceeding said first diameter by at least 15 percent.

16. The friction clutch of claim 1, wherein said sections include bridges each flanked by one of said open slots and one of said closed slots, the width of said bridges, as considered in the circumferential direction of said diaphragm spring, being at least substantially constant.

17. The friction clutch of claim 1, wherein the width of said prongs, as considered in the circumferential direction of the spring, increases radially outwardly toward said marginal portion.

18. A friction clutch, especially a multiple-disc clutch, comprising a pair of axially movable pressure plates; a pair of clutch plates flanking said presure plates; and a diaphragm spring disposed between said pressure plates and including a circumferentially extending marginal portion engaging one of said pressure plates and a second portion disposed radially inwardly of said marginal portion, one of said portions engaging the other of said pressure plates radially inwardly of the locus of engagement between said marginal portion and said one pressure plate so that said pressure plates are biased against the respective clutch plates in the engaged condition of the clutch, said second portion including a part disposed radially inwardly of the region of engagement of said one portion with said other pressure plate and comprising a plurality of sections which are connected to each other at locations disposed radially inwardly of said region of engagement, said second portion having an annulus of inwardly extending prongs and open slots alternating with said prongs, said second portion further having closed slots having inner portions terminating radially outwardly of said open slots and cutouts provided in said prongs and each overlapping the neighboring inner portions and open slots, as considered in the radial direction of said spring.

19. The friction clutch of claim 18, wherein said cutouts are elongated and extend substantially radially of said spring.

20. The friction clutch of claim 19, wherein said open slots and at least the inner portions of said closed slots extend substantially radially of the diaphragm spring.

21. The friction clutch of claim 18, wherein the inner portions of said closed slots terminate at a substantial distance radially outwardly of the neighboring open slots.

22. The friction clutch of claim 18, wherein each of said cutouts is disposed substantially midway between two neighboring open slots and between the inner portions of two neighboring closed slots, as considered in the circumferential direction of said spring.

23. The friction clutch of claim 18, wherein said part of said second portion constitutes a plurality of circumferentially complete tension springs disposed in the regions of said cutouts.

24. The friction clutch of claim 18, wherein each of said inner portions is at least substantially aligned with one of said open slots, as considered in the radial direction of the diaphragm spring.

* * * * *